United States Patent
Schmidt

(10) Patent No.: US 12,528,603 B2
(45) Date of Patent: Jan. 20, 2026

(54) METHOD, DEVICE AND COMPUTER PROGRAM FOR DETERMINING THE POSITION OF A SATELLITE USING A STAR TRACKER

(71) Applicant: JENA-OPTRONIK GMBH, Jena (DE)

(72) Inventor: Uwe Schmidt, Buergel (DE)

(73) Assignee: JENA-OPTRONIK GMBH (DE)

( * ) Notice: Subject to any disclaimer, the term of this patent is extended or adjusted under 35 U.S.C. 154(b) by 103 days.

(21) Appl. No.: 18/703,621

(22) PCT Filed: Oct. 26, 2022

(86) PCT No.: PCT/EP2022/079891
§ 371 (c)(1),
(2) Date: Apr. 22, 2024

(87) PCT Pub. No.: WO2023/072994
PCT Pub. Date: May 4, 2023

(65) Prior Publication Data
US 2024/0425209 A1     Dec. 26, 2024

(30) Foreign Application Priority Data

Oct. 26, 2021  (DE) ...................... 10 2021 127 891.0
Aug. 11, 2022  (DE) ...................... 10 2022 120 279.8

(51) Int. Cl.
*B64G 3/00*     (2006.01)
*G01C 21/02*    (2006.01)

(52) U.S. Cl.
CPC ............. *B64G 3/00* (2013.01); *G01C 21/025* (2013.01)

(58) Field of Classification Search
CPC ................................ B64G 3/00; G01C 21/025
See application file for complete search history.

(56) References Cited

U.S. PATENT DOCUMENTS 6,330,988 B1 * 12/2001 Liu ........................ B64G 1/361
                                                              701/4
2014/0232867 A1   8/2014 Xing et al.

FOREIGN PATENT DOCUMENTS

DE   102020122748 B3   2/2022
EP       2506027 A1   10/2012

OTHER PUBLICATIONS

European Patent Office; Search Report in related International Patent Application No. PCT/EP2022/079891 dated Feb. 22, 2023; 4 pages.

* cited by examiner

Primary Examiner — Georgia Y Epps
Assistant Examiner — Don J Williams
(74) Attorney, Agent, or Firm — Dorton & Willis, LLP

(57) ABSTRACT

A method for determining the position of a satellite rotating about an axis of rotation using at least a star tracker which is aligned along an optical axis with a recorded light object field, the axis of rotation and the optical axis being at a fixed angle relative to one another and a light sensor having a sensor surface which is perpendicular to the optical axis and contains a sensor coordinate system having an arrangement of light-sensitive pixels in rows being provided. To achieve improved position control of the satellite, image data recorded in the individual rows of the light sensor are recorded row by row and sequentially, the image data for each row are convoluted with a predefined number of pixels over a predefined time interval using a boxcar operator, a light maximum is identified using the boxcar operator, the light maximum is assigned to a location of a light object on the basis of a position of the row and within the row in the sensor coordinate system, and an object list containing light object coordinates, the light maximum and a measurement time is identified from a plurality of light objects using an over the entire sensor coordinate system.

9 Claims, 2 Drawing Sheets

METHOD, DEVICE AND COMPUTER PROGRAM FOR DETERMINING THE POSITION OF A SATELLITE USING A STAR TRACKER

CROSS-REFERENCE TO RELATED APPLICATIONS

This application is a national phase application under 35 U.S.C. § 371 of International Patent Application No. PCT/EP2022/079891, filed Oct. 26, 2022 (pending), which claims the benefit of priority to German Patent Application No. DE 10 2021 127 891.0, filed Oct. 26, 2021, and German Patent Application No. DE 10 2022 120 279.8, filed Aug. 11, 2022, the disclosures of which are incorporated by reference herein in their entirety.

TECHNICAL FIELD

The invention relates to a method, to a device and to a computer program for determining the position of a satellite rotating about an axis of rotation using at least an optical star tracker having a light sensor which is aligned, relative to the axis of rotation at a predefined angle fixed optical axis, with a recorded light object field and has a sensor surface, which is provided with a sensor coordinate system and has an arrangement of light-sensitive pixels in rows.

BACKGROUND

The invention is based on the prior art of the Jena-Optronik ASTRO star tracker series. These star trackers, such as ASTRO CL, ASTRO APS and its development ASTRO APS3, are used in classic fields of application such as LEO satellites, GEO satellites and scientific satellites. A method, a device and a computer program product for determining the position of a spacecraft in space by means of a star tracker are known from the publication DE 10 2020 122 748 B3.

Due to their mode of operation, the star trackers mentioned above have a natural limitation with regard to the rotation rate tolerance. This is due to the optical opening that can be achieved and thus the amount of light available and the correspondingly short exposure time in order to obtain a star image of individual light objects that is as point-shaped as possible. This means that only very bright stars can be processed at high rotation rates, which can lead to a considerable restriction of the light object field, for example the star field, recorded by the star tracker.

Spin stabilization of satellites rotating about an axis of rotation, preferably about their longitudinal axis, is a simple and resource-saving method for stabilizing the position of a satellite. If permanent earth alignment is required, this method cannot be used advantageously for earth observation missions (LEO, MEO, GEO), but it can be used for deep space missions, such as a flight to Mars. On the flight to Mars, the spacecraft are stabilized, for example, at two to four revolutions per second. This corresponds to a rotation rate range of approximately 12 to 24 deg/sec.

The problem to be solved is that of improving inertial position determination in spin-stabilized satellites using conventional star trackers.

SUMMARY

The problem is solved by a method having the features of the following description for determining the position of a satellite rotating about an axis of rotation by means of at least an optical star tracker. For this purpose, at least one optical star tracker is fixed, with respect to its optical axis, to the satellite, for example to a common support structure or frame structure, at a predefined angle, preferably a right angle, relative to the axis of rotation. To increase the measurement accuracy of the position of the satellite and its position control, additional star trackers and/or other non-optical sensors which record the position of the satellite, such as gyro sensors and/or the like, can be provided if the mass is tolerable and can be evaluated accordingly. The method be designed for inertial position determination. The method can be designed for inertial position determination of spin-stabilized satellites using a conventional star tracker.

The star tracker can record a light object field. The star tracker can record a light object field in space. The light object field can comprise light objects. The light objects can be self-luminous. The light objects can substantially be luminous constantly. The light objects can be stars. The stars can be arranged in a star cluster or star field. The star tracker can comprise the light sensor. The star tracker can have a plurality of optical elements, for example optical lenses, apertures or filters such as a stray light filter and/or the like. The optical elements can form an optical system. The optical system can be designed to generate an image on the light sensor. The optical system can have a fixed or variable focal length and/or optical opening. The optical system can have a fixed or adjustable focal length and/or optical opening. The star tracker can have a star tracker axis. The optical elements and the light sensor can be arranged along the star tracker axis. The light sensor can be designed as a surface sensor having a sensor surface. The sensor surface can be planar, level and/or quadrangular, in particular square. The light sensor can be arranged with its sensor surface perpendicular to the star tracker axis. The star tracker axis can form the optical axis and/or be referred to as the optical axis. The light sensor can have a plurality of light-sensitive sensor elements. The sensor elements can be arranged like a matrix in rows and/or columns. The sensor elements can form pixels and/or be referred to as pixels. The sensor surface can be described using a sensor coordinate system. The sensor coordinate system can be a Cartesian coordinate system having a coordinate origin, an x-axis and a y-axis. The coordinate origin can be assigned to a sensor element which is arranged at a corner of the sensor surface. The sensor elements can be arranged in rows. The sensor element rows can extend in parallel with the x-axis and be arranged one above/below the other in the y-direction. The light sensor can be designed to record image data. The light sensor can be designed to record image data row by row. The light sensor can be designed to record image data row by row and sequentially. The star tracker can be a conventional star tracker and/or be referred to as a conventional star tracker.

The light sensor can map individual light objects, such as stars, in a sensor coordinate system. The current position of the satellite can be determined by taking into account appropriate mathematical calculations and by assignment to a star catalog. The star catalog can be stored in the star tracker and/or in a central control system of the satellite. A corresponding time marker can be assigned to each recording of the light sensor. Assignment can be carried out continuously and/or in real time. This allows the position of the satellite about its axis of rotation and/or its position with respect to other spatial axes to be identified in real time via the angle of rotation about the axis of rotation.

To improve the resolution, the sensor surface of the light sensor can be divided into individual rows, for example a series of one pixel in one row in each case. These rows can be recorded and evaluated sequentially, i.e. row by row. The linearly recorded pixels of a row can be evaluated in such a way that the recorded time interval is assigned to each row and convolution is carried out in a boxcar operator in real time. The boxcar operator can process the noisy signals which may be blurred over a plurality of pixels in a row due to the rotation of the satellite. For this purpose, the boxcar operator can sum the pixel values of the individual pixels along a cut-out interval (box) of pixels, for example forming a light maximum in a triangular function and/or assigning this to a location in the light sensor. For example, the light maximum can be assigned to a location of a light object on the basis of a position of the row and within the row in the sensor coordinate system.

In this way, it is possible to check for each row whether there is a light maximum and therefore a light object. An image having an object list which is formed from a plurality of light objects and contains light object coordinates, the light maximum and a measurement time is identified from this over the entire sensor coordinate system.

This object list can be compared with a stored star catalog and used to identify the position of the satellite at the current time. Alternatively, the position of the satellite can be identified by identifying stars from the object list and calculating the position of the light objects by means of a star group-coded star catalog, as proposed, for example, in the publication DE 10 2020 122 748 B3.

The light-sensitive pixels can be evaluated on the basis of the binning technique. At least two rows, preferably two, three or four rows, can be evaluated for recording the same light maximum (2x2, 3x3 or 4x4 binning). The binning technology can already be implemented on the hardware side of the light sensor and/or downstream in software in order to evaluate the rows.

The physical light object field which can be recorded by the star tracker can be virtually expanded about the axis of rotation if the rotation rate of the satellite is known. For this purpose, a location of one or more light objects, which are rotated out of the light object field, can be calculated on the basis of the rotation rate of the satellite, for example by extrapolating a last known location and the current rotation rate of the satellite. In this way, for example, the position of the satellite in an image having a limited number of light objects can be assigned with greater significance using the star catalog.

In particular in the case of an alignment of the linearly distorted light points of adjacent pixels over a plurality of rows, which can occur, for example, as a result of a rotation of the satellite outside the axis of rotation, and in the case of a non-orthogonal arrangement of the axis of rotation and the optical axis, the light signals of a light object are arranged linearly in a linear working direction of the boxcar operator by means of digital image processing before the boxcar operator is applied.

The method can be provided as a routine which can be switched on and off for conventionally recording the position of the satellite by means of a star tracker. For example, the star tracker can be operated without the proposed method and in a 3-axis position stabilization when the satellite reaches an orbit of a mass body such as a planet, in particular Mars.

The method can be designed for inertial position determination of spin-stabilized satellites having a conventional star tracker. The following steps can be carried out: sequentially inputting image data row by row; convoluting the input image data of e.g. row #n (11) from t0 to t2 using an adapted (e.g. 30 pixels-wide) boxcar operator in real-time image processing, for example carried out using FPGA-based, ASIC-based or processor-based data processing in the star tracker; the adapted boxcar operator sums the input noisy star trail signal pixel by pixel to form a triangular function having the maximum of, for example, 210 ADC counts (according to the example of the embodiment 4.5 mag, 1.6 ms, 7 ADC counts); the noise of the star trail signal is reduced accordingly; the maximum of the convoluted signal marks the star location (x, y) of a star in row #n in a detector coordinate system; an object list consisting of star coordinates, the maximum signal and the measurement time is created over the entire image and/or a star is identified and the position is calculated on the basis of the object list according to the invention filed in the German patent application no. 10 2020 122 748.5 filed on Aug. 31, 2020 using an adapted star group-coded star catalog.

Reducing a detector resolution can lead to an improvement in a radiometric signal budget (larger SNR) by 2x2 or 4x4 binning, for example, so that dimmer stars can be processed, which can lead to a higher availability (coverage) of the star tracker at reduced accuracy. If the rotation rate is known, the physical star tracker field of view can be virtually expanded by calculating a star location of stars which are going out using a rotation rate. The method can advantageously utilize a strip-shaped star image along a row due to a fixed spin axis and the star tracker which is fixedly aligned with it. The spin axis can also be referred to as the axis of rotation. The alignments of the spin axis and star tracker can be arbitrary, which can therefore lead to star trails in any direction on the detector. Before applying the boxcar operator, the image data can be rotated by means of digital image processing. The method can be implemented in the star tracker in such a way that it can operated so as to be switched on and off for conventional data processing. The star tracker can continue to be used operationally in its conventional mode when the satellite reaches Mars orbit and transitions to 3-axis position stabilization.

In other words, for example, based on an advantageously designed embodiment, the core of the invention is the advantageous utilization of row-by-row reading and row-by-row processing of the image information from matrix image sensors, for example a light sensor having 1024x1024 pixels such as CMOS APS, CCD and/or the like. In contrast to conventional exposure times of star trackers, the exposure time is extended to 40 to 50 ms, for example at a readout frequency of approximately 4 Hz, so that the light intensity of a light object in a trail is distributed linearly over a plurality of pixels along the rows of the light sensor. For example, a field of view specified by the optics of the star tracker, such as the light object field, can be 20 deg, resulting in an exposure time (pixel dwell time) of approximately 1.6 ms or 0.02 deg per pixel at a total exposure time of 40 to 50 ms. This exposure time results in a distribution of light for a light object of over approximately 30 pixels in a row so that the processing of the boxcar operator can be limited to 30 pixels. If the brightness of a light object is, for example, 4.5 mag, 7 counts are generated per pixel at the AD converter (ADC counts).

Preferably and without risking deviations of the trail of a light object from a row, the star tracker is aligned orthogonally to the axis of rotation, such as the spin axis, of the satellite. The rows of the light sensor in the star tracker are also orthogonal to the axis of rotation.

The light of a light object distributed linearly along a row is mathematically convoluted with an adapted boxcar operator in real time of the pixel data stream. The boxcar operator substantially corresponds to the length of the trail of a light object in pixel units. This length is known from the known rotation rate and the applied exposure time. The evaluation of the convolution operation in the boxcar operator results, for example, in a triangular function having increasing and decreasing light intensity across the row and a light maximum which represents the center of gravity of the light object.

The result, namely the center of gravity, maximum signal and system time, is stored in a computing unit of the star tracker and used to calculate the position of all other light objects processed in this way. The position is calculated using star identification and the quaternion method, for example in accordance with publication 10 2020 122 748 B3. For example, system-adapted star-group catalog coding is used.

To suppress interfering radiation events, for example, a star tracker corresponding to a "stellar gyro," which is an optical sensor system for alignment and rotation rates of spacecraft, can be used. The optical sensor system known as the "stellar gyro" has the following properties, for example: providing one or more image processing units (electronic unit having processor) and a plurality of star trackers, which are arranged on different optical axes and have a different alignment on the satellite, having an alignment angle of the optical axes relative to one another, for example >60 deg, preferably having an orthogonal arrangement. This reduces the glare problem of individual star trackers and lower accuracy along each optical axis (line of sight). Furthermore, a data processing program running on one or more processors can be used to detect and eliminate disturbances in the image data from the star trackers (e.g. caused by solar flares). Alternatively or additionally, a data processing program can be provided for calculating the position (alignment) and rotation rates of the star trackers from the preprocessed image data in quasi-real time, which program also runs on one or more image processing units downstream of the aforementioned data processing program. There is no need for rotation rate sensors when using this solution. The combination of these features results in an optical sensor system having very high availability even in the event of glare from one or a subset of the, for example five, star trackers present and also in the event of high rotation rates at which the star objects are blurred in a strip shape in at least some image portions. System architectures of varying complexity can be selected and are used depending on the orbit and dynamic requirements as well as redundancy requirements to achieve reliability and availability specifications.

The problem is also solved by a device for carrying out the proposed method. For this purpose, at least one star tracker can be provided, which is fixed to a satellite, with respect to its optical axis, at a predefined angle relative to its axis of rotation and has a light sensor, such as a matrix sensor, having light-sensitive light points, such as pixels, arranged in rows one below the other. Optics for adjusting a predefined or predefinable focal length can be connected upstream of the light sensor in the direction of a light object field, such as a star field. The star tracker contains an evaluation unit which can be designed to record and evaluate light signals from the pixels as image data. The evaluation unit can have at least one processor, at least one working memory, at least one data memory and/or at least one signal interface. The evaluation unit can be structurally and/or functionally distributed. The device can be structurally and/or functionally separate from the satellite. The device can be partly or fully structurally and/or functionally integrated into the satellite. In this respect, the device can also be a satellite or a module of a satellite.

The computer program or the program code portions can be available as a computer program product. The computer program or the program code portions can be available on a data memory or data carrier as a downloadable, installable and/or executable program file. The computer program or program code portions can be designed to be loaded into a working memory and/or executed using at least one processor. The computer program or the program code portions can be stored in a memory of the evaluation unit having at least one software routine, which is called up and processed continuously or if required, for carrying out the proposed method. In this respect, the computer program per se serves to solve the stated problem. The computer program can be installed and/or executed on a device having at least one star tracker.

The invention is explained in more detail with reference to the embodiments shown in FIGS. 1-5.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
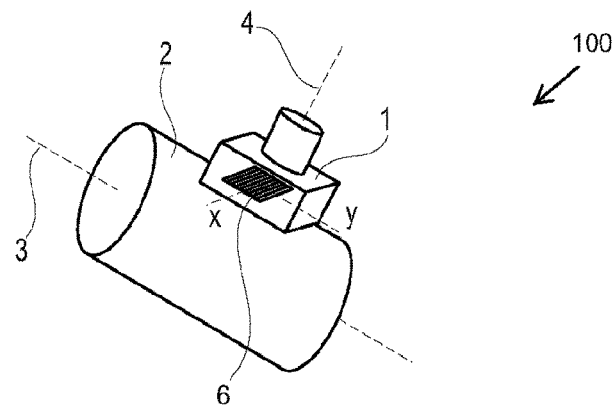
FIG. 1 shows a schematic representation of a satellite having a star tracker.

FIG. 1 shows the satellite 100 with its outer structure 2. The satellite 100 is spin-stabilized about the axis of rotation 3 and rotates about the axis of rotation 3 at a predefined rotation rate. The star tracker 1 is mounted orthogonally on the satellite 100 with its optical axis 4 and records image data of a light objective field, such as a star field, which is predefined by its optics. The light sensor 6 has a row-like arrangement of pixels, with the rows each being aligned in the x-direction of the light sensor 6 and thus tangentially along the axis of rotation 3. The rows are arranged in the y-direction.

Figure 2:
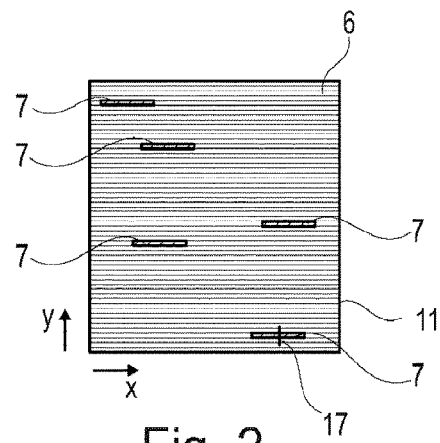
FIG. 2 shows a schematic representation of the sensor surface of a light sensor of the star tracker of FIG. 1.

FIG. 2 shows a schematic view of the light sensor 6 having a number of rows 11 which are arranged in the x-direction and in each of which a number of light-sensitive pixels is arranged. Rows 11 are arranged in parallel in the y-direction. Due to the relationship between the rotation rate of the satellite 100 and the exposure time of the light sensor 6, the light intensities of a light object such as a star blur into the trails 7, with the exact location of the light object being determined by the light maximum 17.

Figure 3:
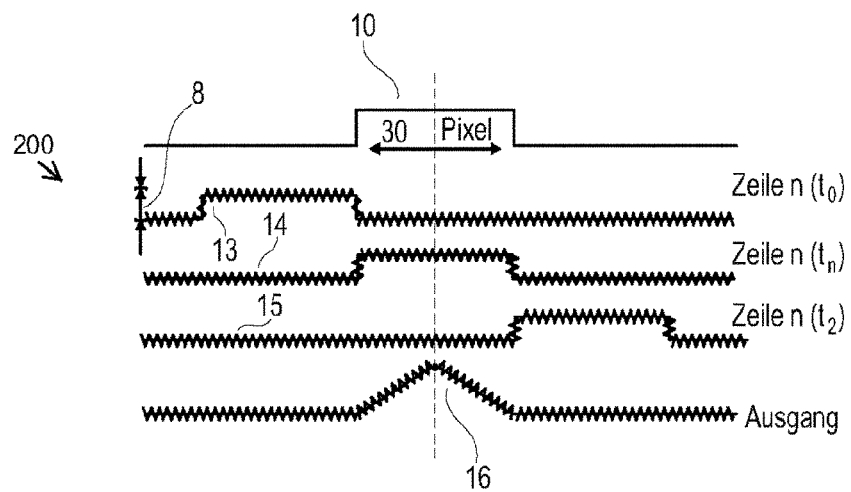
FIG. 3 shows a diagram with the schematic representation of light signals from the light sensor of FIG. 1 using a boxcar operator.

With reference to FIG. 2, FIG. 3 shows the diagram 200 having the evaluation of a light signal 8 of a row 11 from FIG. 2 as row n. From the row n shown here, the image data 13, 14, 15 are convolved over the time points $t_0$, $t_n$, $t_2$ and the boxcar operator 10 is applied. In the exemplary embodiment shown, the boxcar operator 10 has a width of 30 pixels, which corresponds to the ratio of the rotation rate of the satellite 100 (FIG. 1) to the exposure time of the light sensor 6 (FIG. 1). Each of the convoluted rows 11 of the light sensor 6 is processed in the processor 16 the light maximum of the trails 7, which correspond to the exact location of the light object recorded in this row at the recorded time. In this way, an object list is created for all rows 11 with assignment of the exposure time, the light maximum and the associated location, which can be supplied to position control of the satellite. Processing the image data 13, 14, 15 using the boxcar operator leads to a significant reduction in noise.

Figure 4:
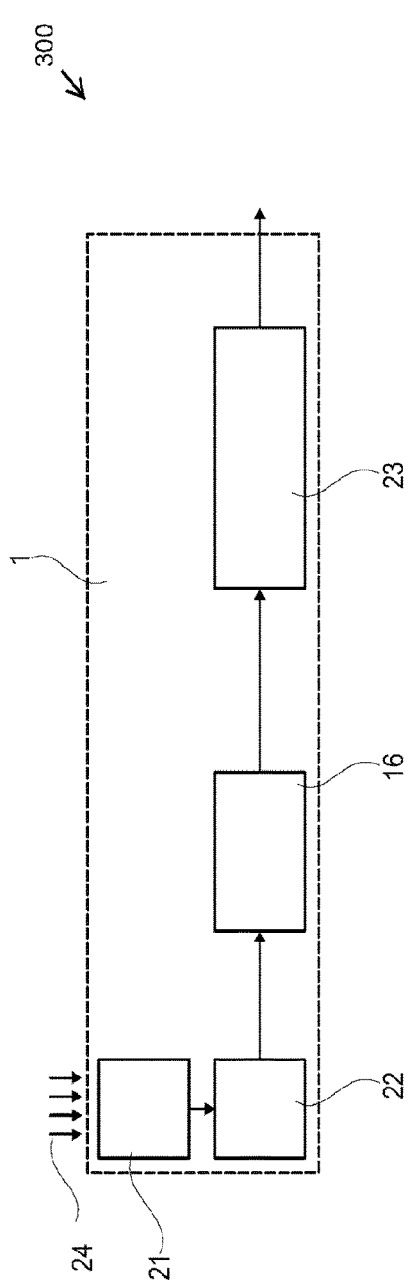
FIG. 4 shows a block diagram of a star tracker.

FIG. 4 shows the block diagram 300 of the star tracker 1. The light irradiation 24, for example starlight, is irradiated via the optics 21 onto the detector 22 having the light sensor 6 (FIG. 1). The processor 16 records the irradiated image data and controls the detector 22. The calculation and evaluation routines, including the computer program for carrying out the boxcar operator, are stored in the computing unit 23, such as the evaluation unit, which is implemented in the processor. The position of the satellite identified by the processor is supplied to position control of the satellite 100 (FIG. 1).

Figure 5:
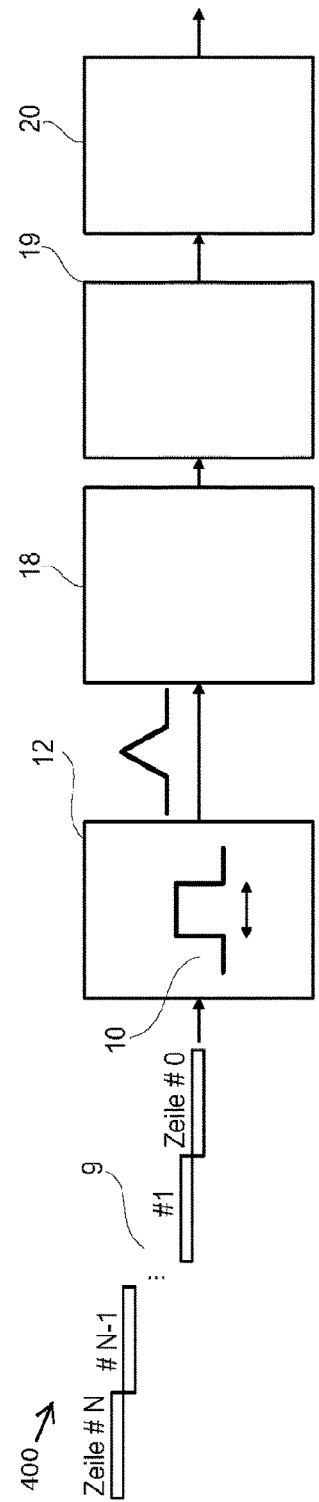
FIG. 5 shows a flow chart for calculating the position of the satellite of FIG. 1 using the star tracker of FIG. 1.

FIG. 5 shows the flow chart 400 for identifying the position of the satellite 100 of FIG. 1. Data recording 9 from the star tracker 1 (FIG. 4) sequentially records the individual rows #N, #N−1, #1, #0 of the light sensor 6 (FIG. 1) and supplies them for real-time image processing 12. In this, the rows are each supplied to the boxcar operator 10 in a convolution over time. The recorded rows are evaluated in the boxcar operator, for example, according to a function f (ω, ti). The width of the boxcar operator 10, for example in the form of 30 pixels, results from the rotation rate w of the satellite about the axis of rotation d and the integration time ti of the light sensor. The functionality of the boxcar operator 10 can be provided in both hardware and software. This can be advantageously provided in the hardware of the light sensor due to processing the light signals row by row. The boxcar operator 10 is provided in corresponding software depending on the possible data throughput of the processor.

The time-dependent light maximum of each row is formed in the boxcar operator 10 and transferred to the collecting apparatus 18. There, an object list of all the recorded light objects is created from the information regarding the time, the signal intensity and the location of the calculated light maximum of each individual row. During star identification 19, for example, individual stars or adapted star groups are identified by means of a star catalog and supplied to position calculation 20. During position calculation 20, the position is calculated from the identified stars or star groups, for example on the basis of the quaternion method and the rotation rate of the satellite.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 1 star tracker
2 external structure
3 axis of rotation
4 optical axis
6 light sensor
7 trail
8 light signal
9 data recording
10 boxcar operator
11 row
12 real-time image processing
13 image data
14 image data
15 image data
16 processor
17 light maximum
18 collecting apparatus
19 star identification
20 position calculation
21 optics
22 detector
23 computing unit
24 light irradiation
100 satellite
200 diagram
300 block diagram
400 flow chart

What is claimed is:

1. A method for determining the position of a satellite that is rotating about an axis of rotation at least using a star tracker affixed to the satellite and which is aligned along an optical axis with a recorded light object field, wherein the axis of rotation and the optical axis are arranged at a fixed angle relative to one another, the star tracker including a light sensor having a sensor surface which is perpendicular to the optical axis, the method comprising:
    recording image data from the light sensor row by row and sequentially;
    convoluting the image data for each row with a predefined number of pixels over a predefined time interval using a boxcar function;
    identifying a light maximum using the boxcar function;
    assigning a location of a light object based on a position in a sensor coordinate system of the row, and a position within the row, corresponding to the identified light maximum; and
    creating an object list containing coordinates corresponding to the location of the light object, the light maximum, and a measurement time identified from a plurality of light objects using an image recorded over the entire sensor coordinate system.

2. The method of claim 1, further comprising:
    identifying a star from the object list; and
    calculating a position of one or more of the light objects from the object list using a star group-coded star catalog.

3. The method of claim 1, further comprising:
    evaluating light-sensitive pixels using data binning, wherein at least two rows are evaluated to record the same light maximum.

4. The method of claim 1, further comprising:
    virtually expanding the physical light object field by calculating, based on a known rotation rate of the satellite, a location of a light object that is rotated out of the light object field.

5. The method of claim 1, further comprising:
bringing light points extending linearly outside a row into a linear working direction of the boxcar function using digital image processing before the boxcar function is applied.

6. The method of claim 1, further comprising:
operating the star tracker to determine the position of a satellite until reaching an orbit around a central body; and
operating the star tracker in a 3-axis position stabilization mode after the satellite reaches the orbit around the central body.

7. A device for determining the position of a satellite that is rotating about an axis of rotation, the device comprising:
at least one star tracker fixed to the satellite and aligned along an optical axis with a light object field at a predefined angle relative to an axis of rotation of the satellite;
the star tracker including a light sensor having pixels aligned in parallel rows arranged one below the other; and
an evaluation unit configured for evaluating recorded image data from the light sensor according to the method of claim 1.

8. The device of claim 7, wherein the predefined angle is orthogonal to the axis of rotation of the satellite.

9. A computer program product for determining the position of a satellite that is rotating about an axis of rotation at least using a star tracker affixed to the satellite and which is aligned along an optical axis with a recorded light object field, wherein the axis of rotation and the optical axis are arranged at a fixed angle relative to one another, the star tracker including a light sensor having a sensor surface which is perpendicular to the optical axis, the computer program product having program code stored on a non-transitory, computer-readable medium, the program code configured to, when executed by a computer, cause the computer to:
record image data from the light sensor row by row and sequentially;
convolute the image data for each row with a predefined number of pixels over a predefined time interval using a boxcar function;
identify a light maximum using the boxcar function;
assign a location of a light object based on a position in a sensor coordinate system of the row, and a position within the row, corresponding to the identified light maximum; and
create an object list containing coordinates corresponding to the location of the light object, the light maximum, and a measurement time identified from a plurality of light objects using an image recorded over the entire sensor coordinate system.

\* \* \* \* \*